(12) United States Patent
Xu et al.

(10) Patent No.: US 11,930,164 B2
(45) Date of Patent: Mar. 12, 2024

(54) SELECTION OF EXPLICIT MODE OR IMPLICIT MODE IN INTRA BLOCK COPY CODING

(71) Applicant: Tencent America LLC, Palo Alto, CA (US)

(72) Inventors: Xiaozhong Xu, State College, PA (US); Shan Liu, San Jose, CA (US); Xiang Li, Saratoga, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/943,373

(22) Filed: Sep. 13, 2022

(65) Prior Publication Data

US 2023/0007242 A1 Jan. 5, 2023

Related U.S. Application Data

(63) Continuation of application No. 17/232,685, filed on Apr. 16, 2021, now Pat. No. 11,503,276, which is a
(Continued)

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/44* (2014.11)

(58) Field of Classification Search
CPC .. H04N 19/105; H04N 19/159; H04N 19/176; H04N 19/44
See application file for complete search history.

(56) References Cited

U.S. PATENT DOCUMENTS

| 10,142,654 B2 | 11/2018 | Peng |
| 2008/0253456 A1 | 10/2008 | Yin |

(Continued)

FOREIGN PATENT DOCUMENTS

| JP | 2017130938 A | 7/2017 |
| KR | 20170029549 A | 3/2017 |
| KR | 20170046770 A | 5/2017 |

OTHER PUBLICATIONS

Canadian Office Action dated Nov. 24, 2022 in Application No. 3132479, p. 1-8.
(Continued)

*Primary Examiner* — Zaihan Jiang
(74) *Attorney, Agent, or Firm* — ARENTFOX SCHIFF LLP

(57) ABSTRACT

A method for video encoding includes determining whether coding of a current block in an IBC prediction mode is performed in an explicit mode or an implicit mode based on whether a difference exists between a block vector and a corresponding block vector predictor. The current block is part of a current picture to be coded. The method further includes constructing a block vector predictor candidate list for the current block, the block vector predictor candidate list having a first number of block vector predictor candidates in the implicit mode, and having a second number of block vector predictor candidates in the explicit mode. The method further includes selecting a block vector predictor candidate from the constructed block vector predictor candidate list and encoding the current block according to the selected block vector predictor candidate.

20 Claims, 14 Drawing Sheets

Related U.S. Application Data continuation of application No. 16/531,827, filed on Aug. 5, 2019, now Pat. No. 11,012,686.

(60) Provisional application No. 62/816,051, filed on Mar. 8, 2019.

(51) Int. Cl.
*H04N 19/176* (2014.01)
*H04N 19/44* (2014.01)

(56) References Cited

U.S. PATENT DOCUMENTS

| | | | |
|---|---|---|---|
| 2009/0010337 A1 | 1/2009 | Wang | |
| 2012/0114039 A1* | 5/2012 | Wang | H04N 11/02 375/E7.243 |
| 2015/0189272 A1* | 7/2015 | Peng | H04N 19/119 375/240.02 |
| 2015/0195559 A1* | 7/2015 | Chen | H04N 19/11 375/240.16 |
| 2015/0334405 A1* | 11/2015 | Rosewarne | H04N 19/176 375/240.02 |
| 2015/0373370 A1* | 12/2015 | Rapaka | H04N 19/52 375/240.02 |
| 2016/0100189 A1 | 4/2016 | Pang et al. | |
| 2017/0099495 A1 | 4/2017 | Rapaka et al. | |
| 2017/0118484 A1* | 4/2017 | Maeda | H04N 19/182 |
| 2017/0155914 A1* | 6/2017 | Jeon | H04N 19/52 |
| 2017/0310987 A1* | 10/2017 | Wu | H04N 19/51 |
| 2018/0249154 A1* | 8/2018 | Chuang | H04N 19/567 |
| 2018/0324454 A1 | 11/2018 | Lin et al. | |

OTHER PUBLICATIONS

Japanese Office Action dated Jul. 19, 2022 in Application No. 2021-531759, with English Translation, pp. 1-13.

Bross, Benjamin et al., Versatile Video Coding (Draft 4), Joint Video Experts Team (JVET) of ITU-T SG 16 WP 3 and ISO / IEC JTC 1 /SC 29/WG 11, 13th Meeting: Marrakech, MA, Jan. 9-18, 2019, [JVET-M1001-v5], JVET-M1001 (version 5), ITU-T, Feb. 27, 2019, pp. 43-48, 147, 213-221.

Xu, Xiaozhong et al., CE8-related: Unified intra block copy block vector prediction, Joint Video Experts Team (JVET) of ITU-T SG 16 WP 3 and ISO / IEC JTC 1 / SC 29/WG 11 14th Meeting: Geneva, CH, Mar. 19-27, 2019, [ JVET-N0382-v2], JVET-N0382 (version 2), ITU-T, Mar. 21, 2019, pp. 1-10.

X. Xu, S. Liu, T. Chuang, Y. Huang, S. Lei, K. Rapaka, C. Pang, V. Seregin, Y. Wang, and M. Karczewicz, "Intra Block Copy in HEVC Screen Content Coding Extensions," IEEE J. Emerg. Sel. Topics Circuits Syst., vol. 6, No. 4, pp. 409-419, 2016.

S. Liu, X. Xu, S. Lei and K. Jou, "Overview of HEVC extensions on screen content coding", APSIPA Transactions on Signal and Information Processing, SIP (2015), vol. 4, e10, p. 1 of 12.

R. Joshi, S. Liu, G. Sullivan, YK Wang, J. Xu, Y. Ye, "HEVC Screen Content Coding Draft Text 6", JCTVC-W1005, Proceeding of 23rd JCT-VC meeting, San Diego, CA, USA, Feb. 2016.

B. Bross, J. Chen, S. Liu, "Versatile Video Coding (Draft 3)", JVET-L1001-v7, Macao, Dec. 2018.

Xiaozhong Xu, Xiang Li and Shan Liu, "CE8: CPR mode with local search ranges (Test CE8.3.1 and CE8.3.2)", JVET-L0293, Macao, Dec. 2018.

Xiaozhong Xu, Xiang Li and Shan Liu, "CE8-related: CPR mode with local search range optimization", JVET-L0297, Macao, Dec. 2018.

Jianle Chen, et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, Document: JVET-M1002-v2, 13th Meeting: Marrakeeh, MA, Jan. 9-18, 2019.

Xiang Li, et al., "Further work on top of Tencent's CfP response", Joint Video Experts Team (JVET) of ITU-T SG 16 WP 3 and ISO/IEC JTC 1/SC 29/WG 11, Document: JVET-J0047-v2, 10th Meeting: San Diego, US, Apr. 10-20, 2018.

Extended European Search Report dated Apr. 11, 2021 in Application No. 20769964.6.

Office Action in KR1020217019338, dated Oct. 20, 2023, 8 pages.

\* cited by examiner

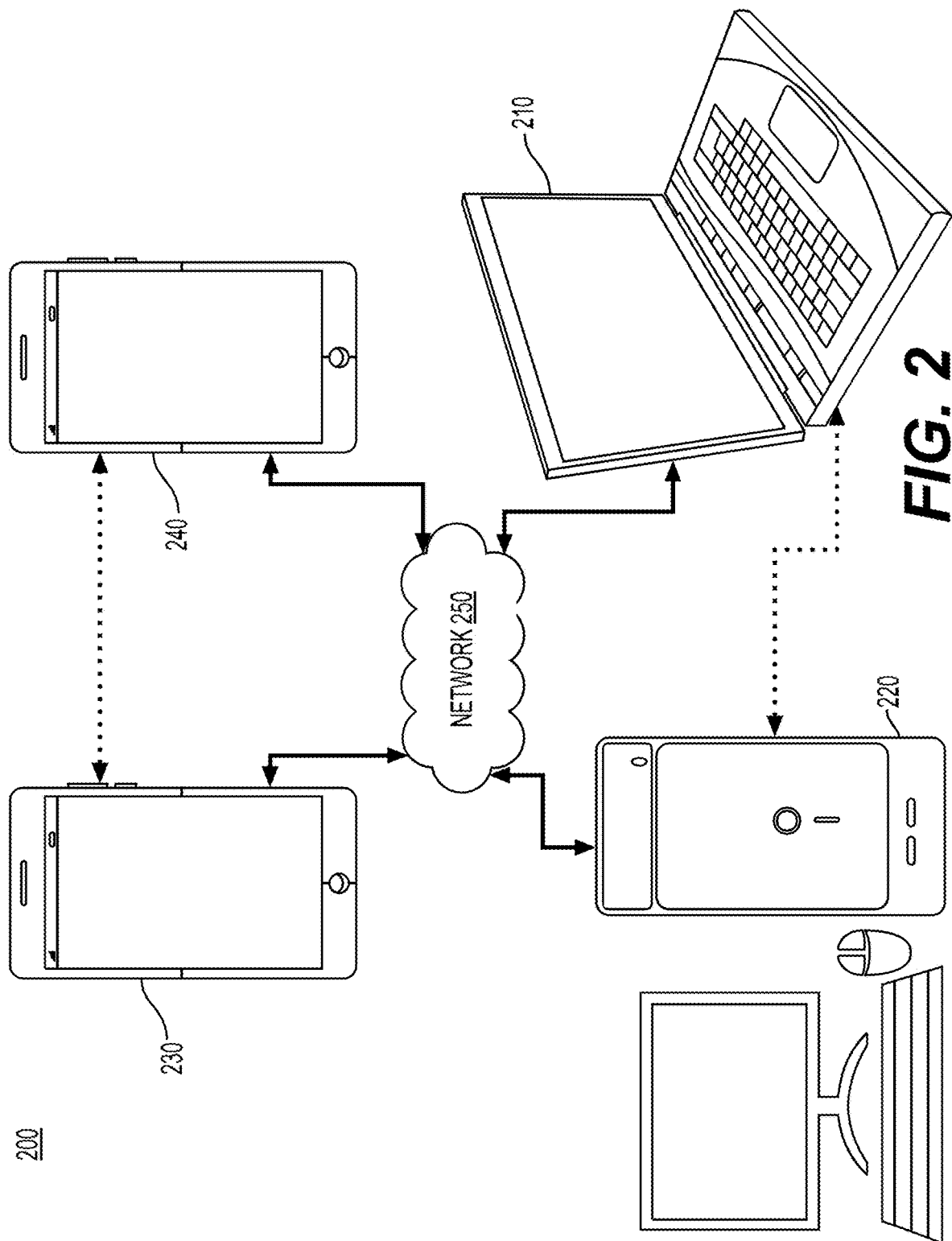

SELECTION OF EXPLICIT MODE OR IMPLICIT MODE IN INTRA BLOCK COPY CODING

CROSS-REFERENCE TO RELATED APPLICATIONS

The present application is a continuation of U.S. application Ser. No. 17/232,685 filed on Apr. 16, 2021, which is a continuation of and claims the benefit of priority under 35 U.S.C. § 120 from U.S. application Ser. No. 16/531,827 filed Aug. 5, 2019, now U.S. Pat. No. 11,012,686, which claims the benefit of priority from U.S. Application No. 62/816,051 filed on Mar. 8, 2019, the entire contents of each of which are incorporated herein by reference.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may be predicted itself.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (105) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

A current block can include samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2. In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry.

The processing circuitry is configured to decode prediction information for a current block in a current coded picture that is a part of a coded video sequence. The prediction information indicates an intra block copy (IBC) prediction mode used for the current block, an index to select a block vector predictor candidate from a block vector predictor candidate list for the current block, and whether a non-zero residue exists for the current block. The processing circuitry constructs the block vector predictor candidate list for the current block in response to the indication that the non-zero residue does not exist for the current block. The block vector predictor candidate list has a first number of block vector predictor candidates and is constructed based on a sequence of candidates. Otherwise, the processing circuitry constructs the block vector predictor candidate list for the current block in response to the indication that the non-zero residue exists for the current block. The block vector predictor candidate list has a second number of block vector predictor candidates and is constructed based on the same sequence of candidates. The processing circuity further selects a block vector predictor candidate from the constructed block vector predictor candidate list based on the index indicated in the prediction information. Finally, the processing circuitry reconstructs the current block according to the selected block vector predictor candidate.

According to an aspect of the disclosure, the processing circuitry further determines whether a first block vector of a first spatial neighboring block of a plurality of spatial neighboring blocks of the current block is available. The processing circuitry inserts the first block vector into the block vector predictor candidate list in response to the determination that the first block vector of the first spatial neighboring block of the plurality of spatial neighboring blocks of the current block is available. The processing circuitry determines whether a second block vector of a second spatial neighboring block of the plurality of spatial neighboring blocks of the current block is available and whether the second block vector of the second spatial neighboring block is the same as the first block vector of the first spatial neighboring block. The processing circuitry inserts the second block vector into the block vector predictor candidate list in response to the determination that the second block vector of the second spatial neighboring block of the plurality of spatial neighboring blocks of the current block is available and that the second block vector of the second spatial neighboring block is not the same as the first block vector of the first spatial neighboring block.

In an embodiment, the first spatial neighboring block of the current block is adjacent to a lower-left corner of the current block and a bottom side of the first spatial neighboring block is aligned to a bottom side of the current block, and the second spatial neighboring block of the current block is adjacent to an upper-right corner of the current block and a right side of the second spatial neighboring block is aligned to a right side of the current block.

In another embodiment, the first spatial neighboring block of the current block is adjacent to the lower-left corner of the current block and a top side of the first spatial neighboring block is aligned to the bottom side of the current block, and the second spatial neighboring block of the current block is adjacent to the upper-right corner of the current block and a left side of the second spatial neighboring block is aligned to the right side of the current block.

In another embodiment, the first spatial neighboring block of the current block is adjacent to a left side of the current block and the second spatial neighboring block of the current block is adjacent to a top side of the current block.

In an embodiment, when a total number of the block vectors of the plurality of spatial neighboring blocks included in the block vector predictor candidate list is less than a maximum allowed number that is based on whether the non-zero residue exists for the current block, the processing circuitry selects a third block vector of a previously coded block from a plurality of block vectors of previously coded blocks. The processing circuitry determines whether the selected third block vector is different from the plurality of spatial neighboring blocks included in the block vector predictor candidate list. The processing circuitry inserts the selected third block vector into the block vector predictor candidate list in response to the determination that the selected third block vector is different from the plurality of spatial neighboring blocks included in the block vector predictor candidate list.

In an embodiment, when a total number of the block vectors of the plurality of spatial neighboring blocks and the previously coded blocks included in the block vector predictor candidate list is less than the maximum allowed number and is above one, the processing circuitry selects a plurality of block vector predictor candidates from the block vector predictor candidate list. The processing circuitry averages the selected plurality of block vector predictor candidates to form at least one averaged block vector. The processing circuitry inserts the at least one averaged block vector into the block vector predictor candidate list.

In an embodiment, when a total number of the block vectors of the plurality of spatial neighboring blocks, the block vectors of the previously coded blocks, and the at least one average block vector included in the block vector predictor candidate list is less than the maximum allowed number, the processing circuitry inserts a default block vector into the block vector predictor candidate list.

In an embodiment, the default block vector is (0, 0).

In an embodiment, the selected block vector predictor candidate is not rounded when the non-zero residue exists for the current block.

In an embodiment, when one of the block vector predictor candidates included in the block vector predictor candidate list is invalid, the processing circuitry performs a pruning process or clipping process to the one of the block vector predictor candidates.

In an embodiment, the one of the block vector predictor candidates is determined to be invalid when a reference block predicted by the one of the block vector predictor candidates is out of an allowed search range for intra block copy (IBC) prediction mode.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 2 is a schematic illustration of a simplified block diagram of a communication system in accordance with an embodiment.

DETAILED DESCRIPTION OF EMBODIMENTS

Figure 1A:
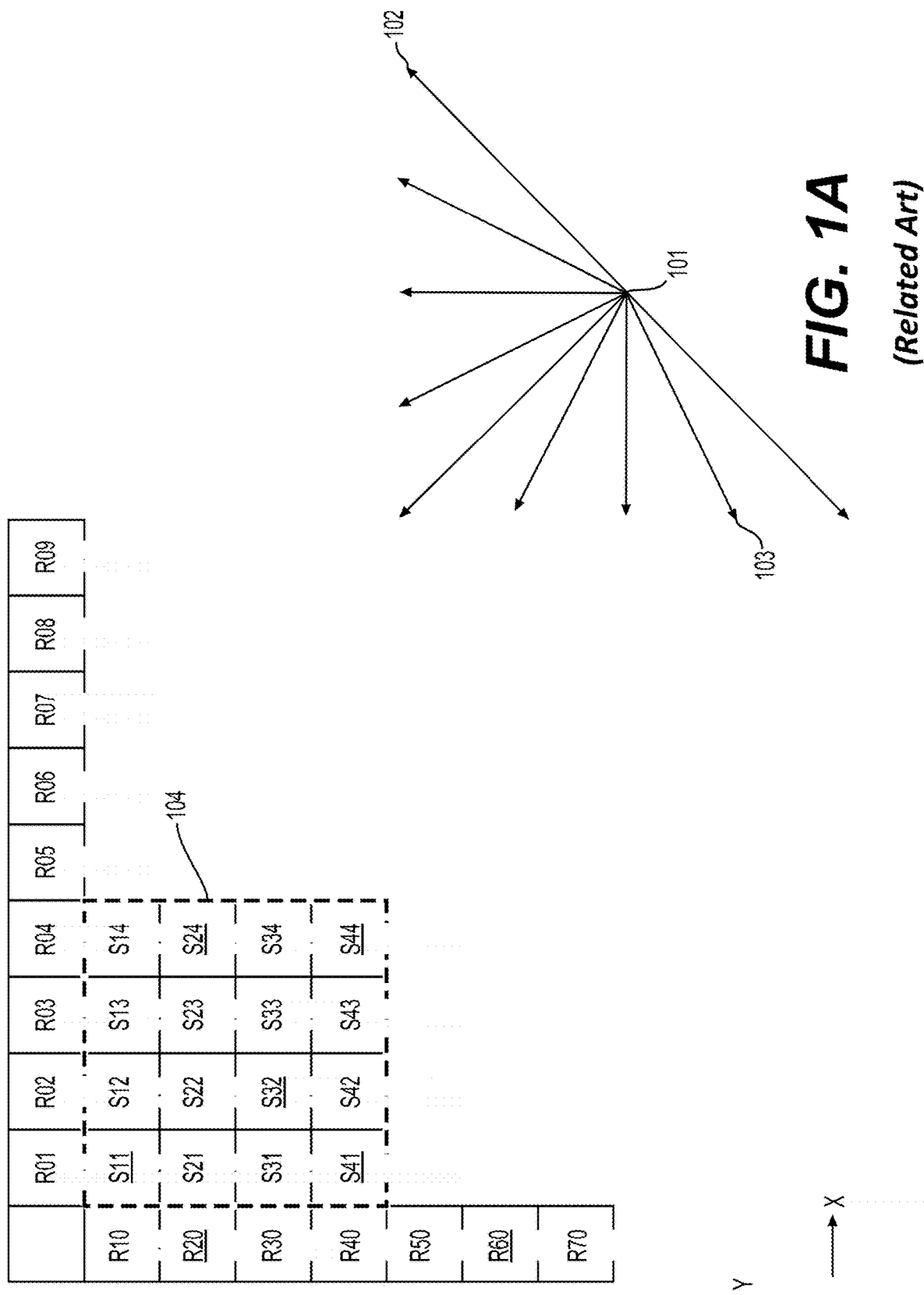
FIG. 1A is a schematic illustration of an exemplary subset of intra prediction modes.
Figure 1B:
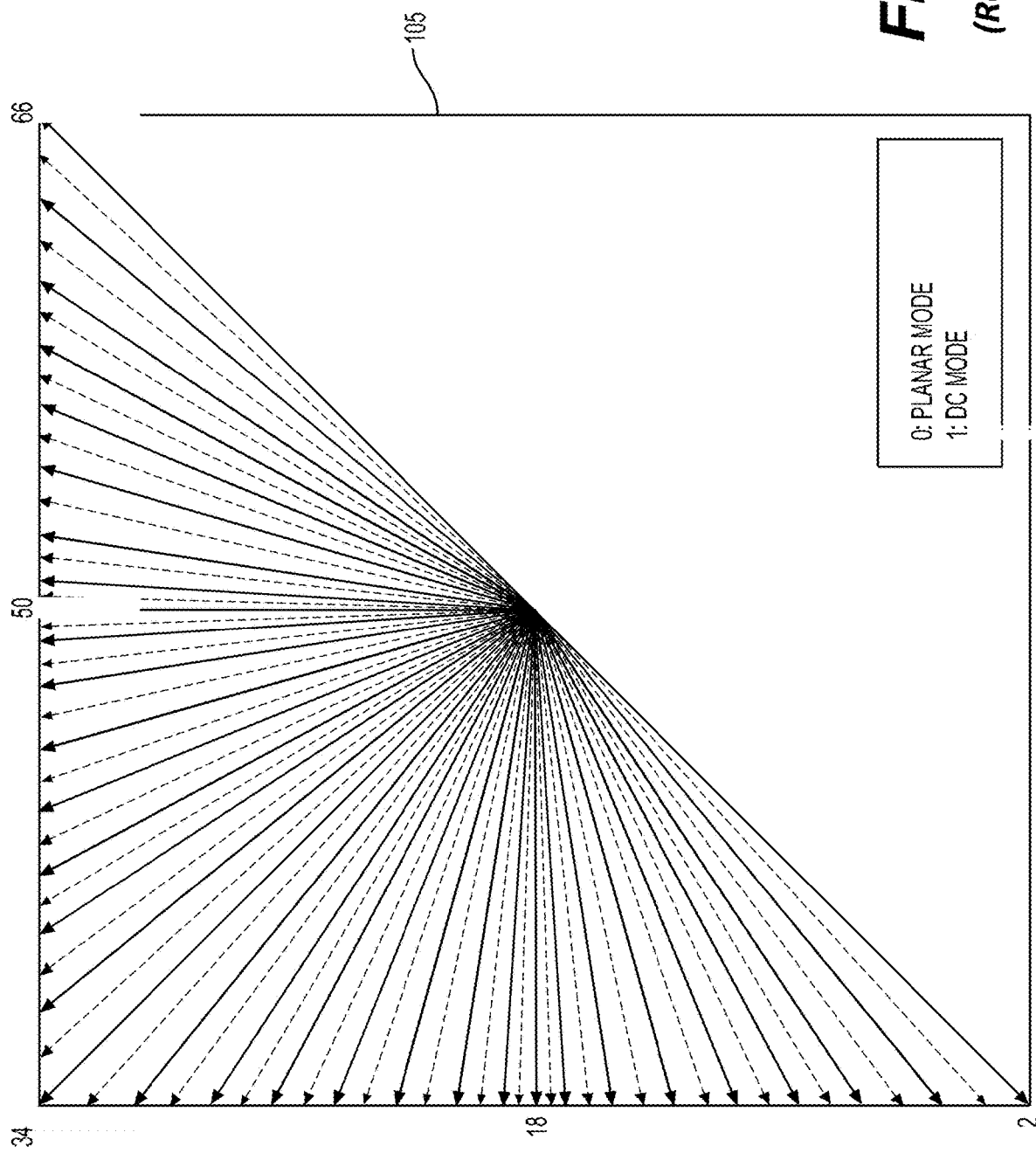
FIG. 1B is an illustration of exemplary intra prediction directions.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
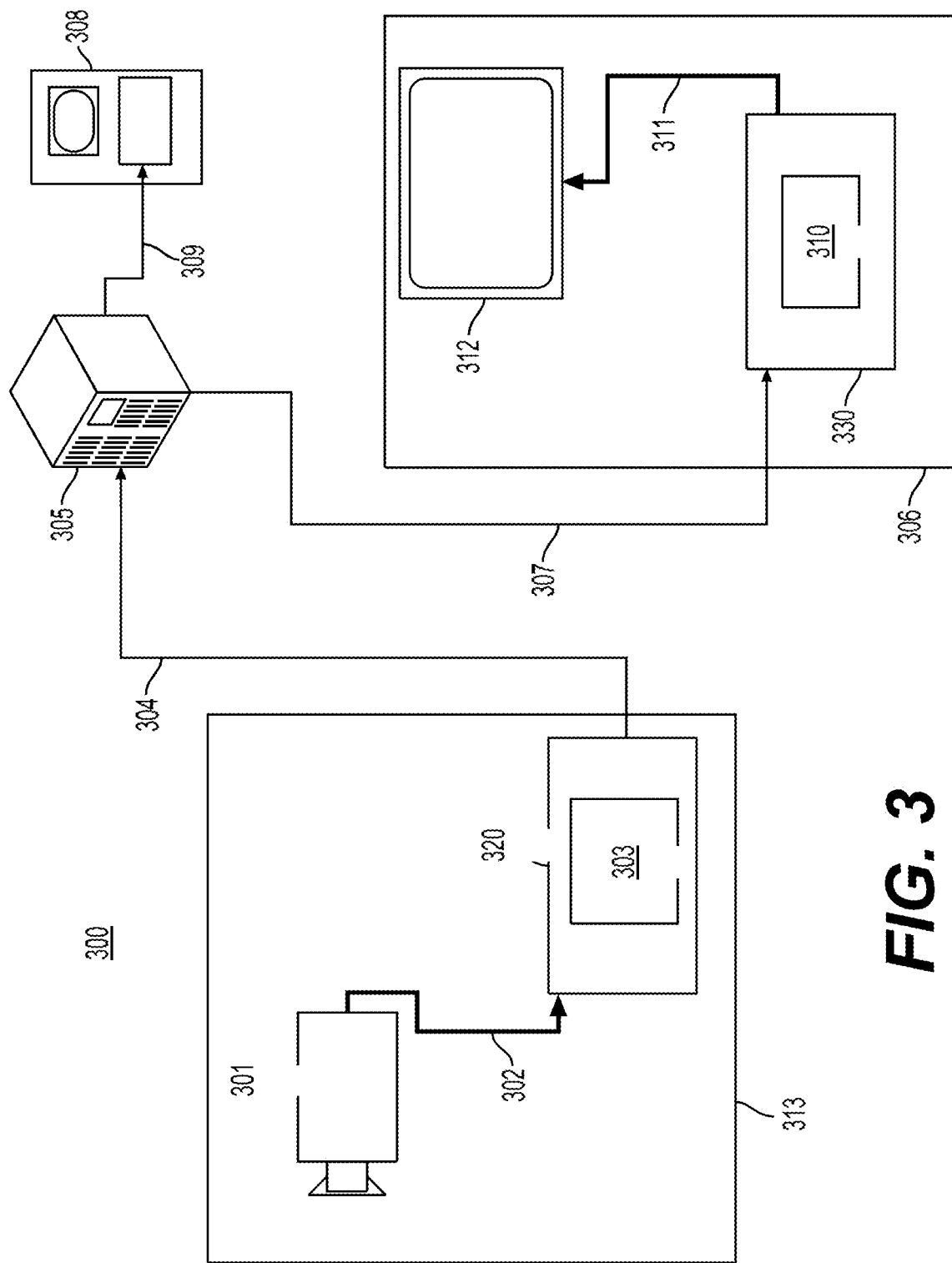
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick, and the like.

A streaming system may include a capture subsystem (313) that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
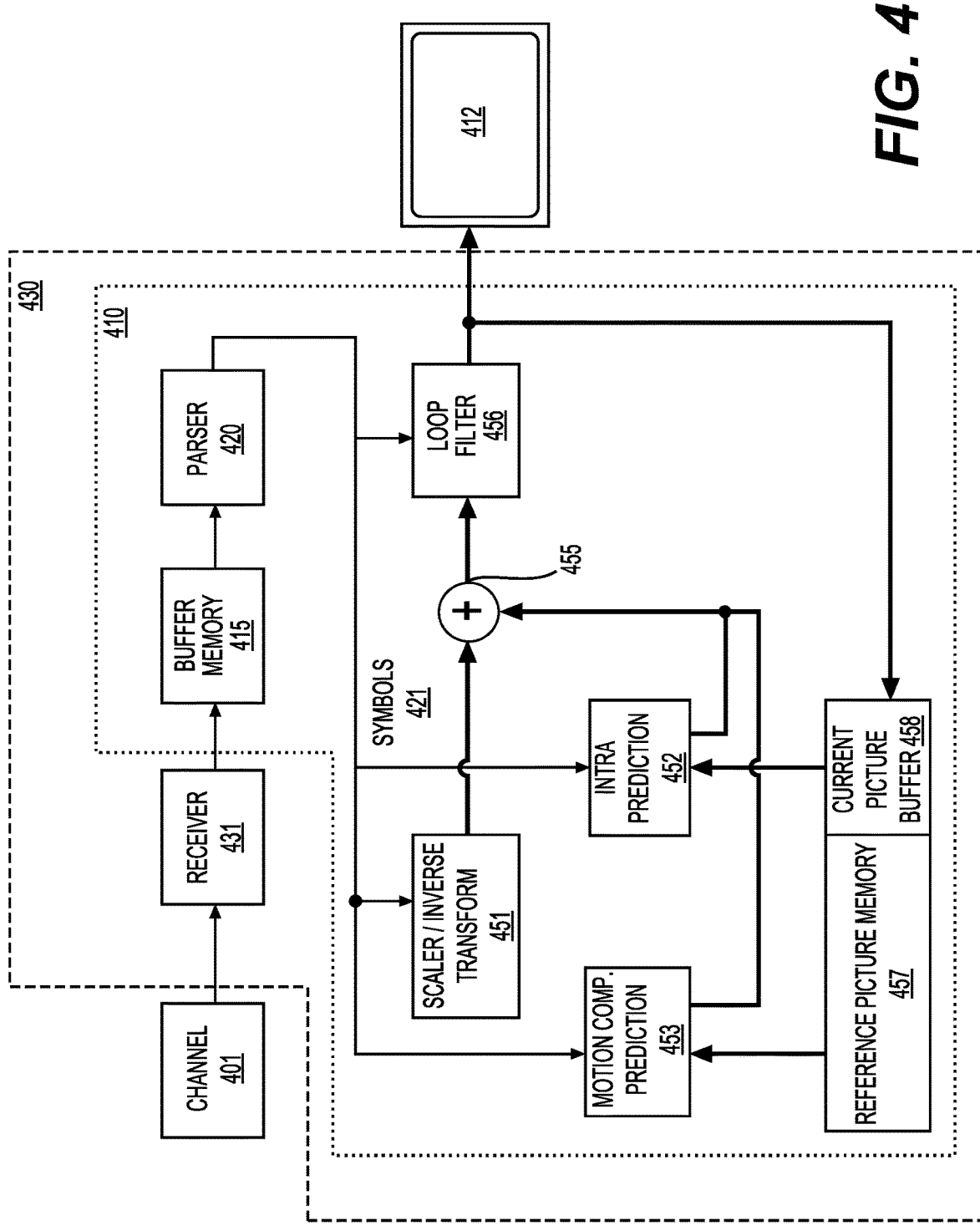
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information that the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
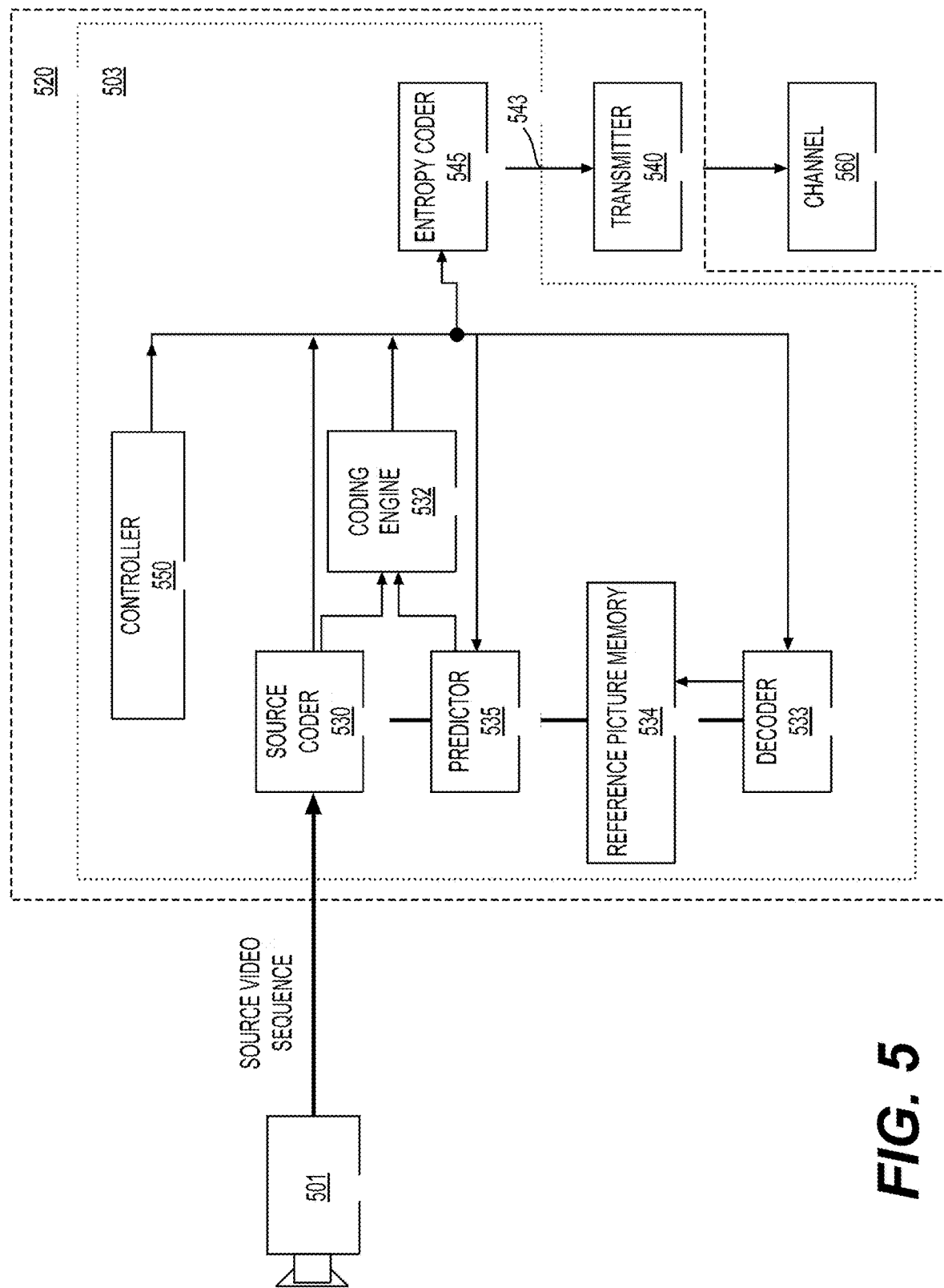
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in 1a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415) and the parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quad-tree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
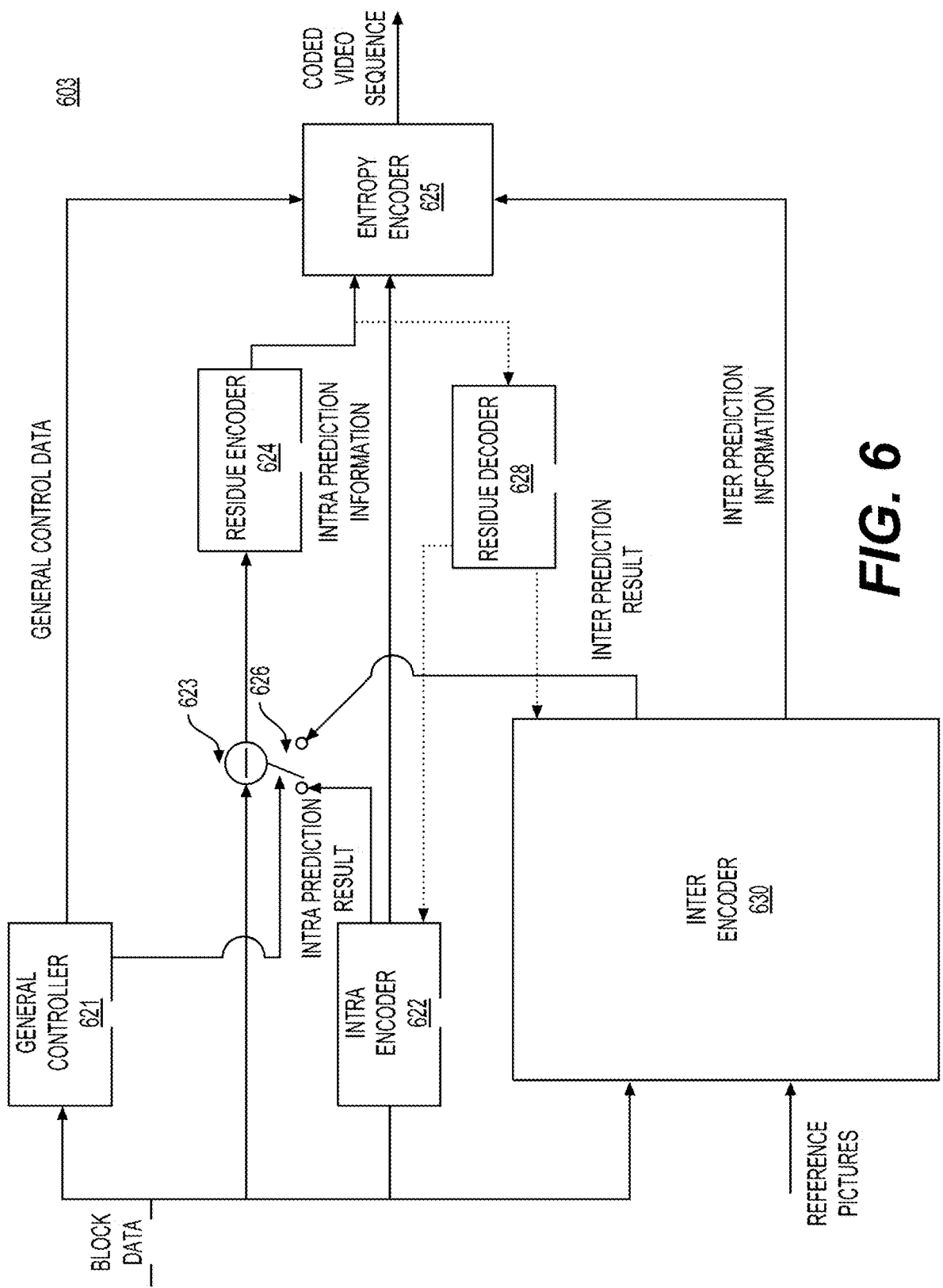
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
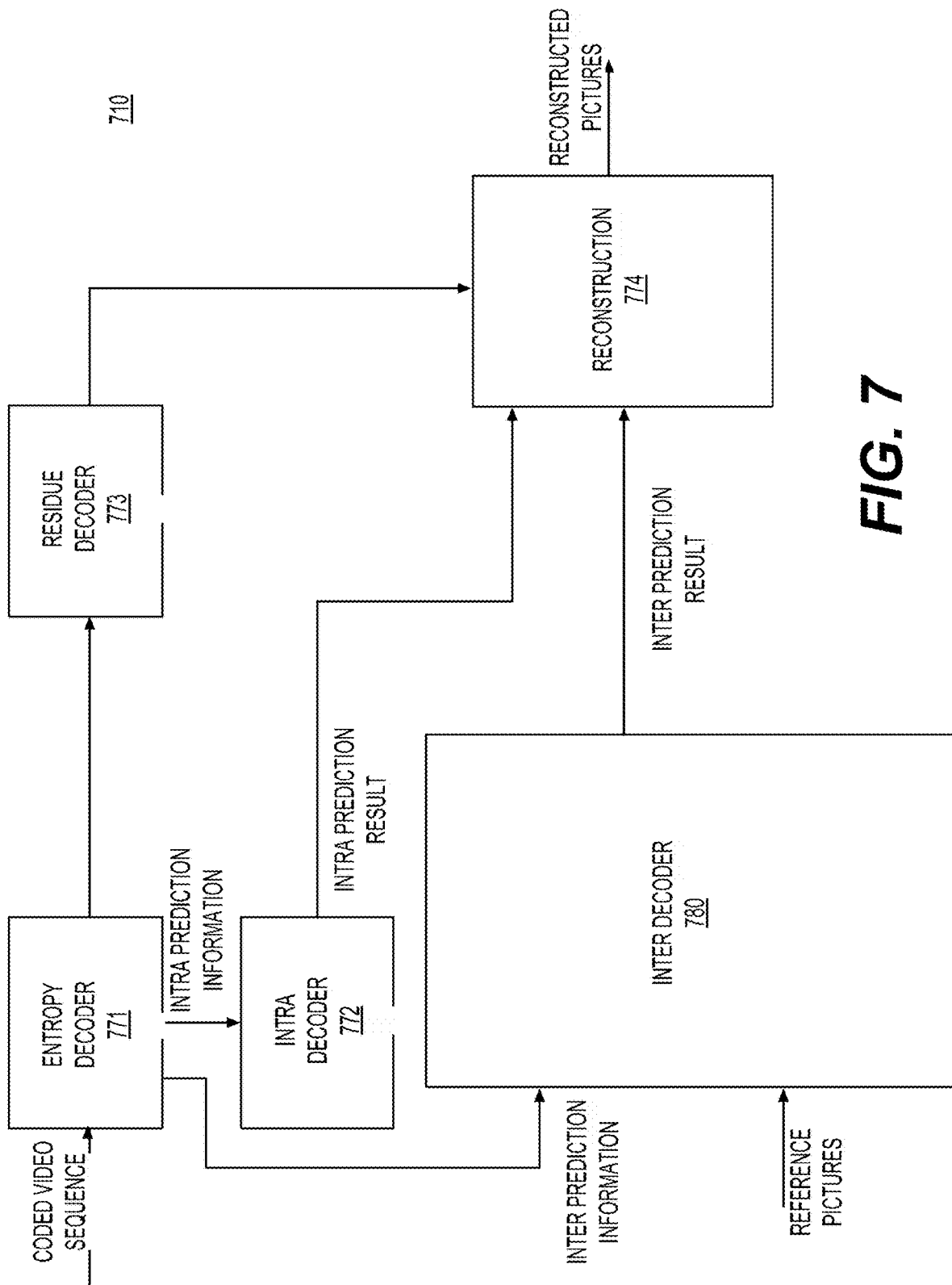
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

In general, block based compensation based on a different picture may be referred to as motion compensation or inter prediction block compensation. However, block compensation may be done from a previously reconstructed area within a same picture. Such block compensation may be referred to as intra picture block compensation, current picture referencing (CPR), or intra block copy (IBC).

Aspects of the disclosure provide techniques for block based compensation within a same picture (e.g., IBC prediction mode).

According to aspects of the disclosure, in the IBC prediction mode, a displacement vector that indicates an offset between a current block and a reference block within the same picture is referred to as a block vector (BV). It is noted that the reference block is already reconstructed prior to the current block. In addition, for parallel processing, a reference area that is at a tile/slice boundary or wave-front ladder shape boundary may be excluded from being used as an available reference block. Due to these constraints, a block vector may be different from a motion vector that can be at any value (positive or negative, at either x or y direction) in motion compensation of the inter prediction mode.

The coding of a block vector in the IBC prediction mode can be either explicit or implicit. In the explicit mode, a block vector difference between a block vector and a predictor of the block vector is signaled. A way of coding a block vector in the explicit mode of the IBC prediction mode may be similar to a way of coding a motion vector in advanced motion vector prediction (AMVP) mode of the inter prediction mode. In the implicit mode, a block vector is recovered from a predictor of the block vector without using a block vector difference, in a similar way as a motion vector prediction in merge mode of the inter prediction mode. In addition, the resolution of a block vector may be restricted to integer positions in one embodiment but may be allowed to point to fractional positions in another embodiment.

The use of the IBC prediction mode at the block level can be signaled using, for example, a block level flag (referred to as an IBC flag) or a reference index. When using the IBC flag, the current block may not be coded in implicit mode. When using the reference index, the current decoded picture can be treated as a reference picture that is put in a last position of a reference picture list. This reference picture may also be managed together with other temporal reference pictures in a decoded picture buffer (DPB).

Figure 8:
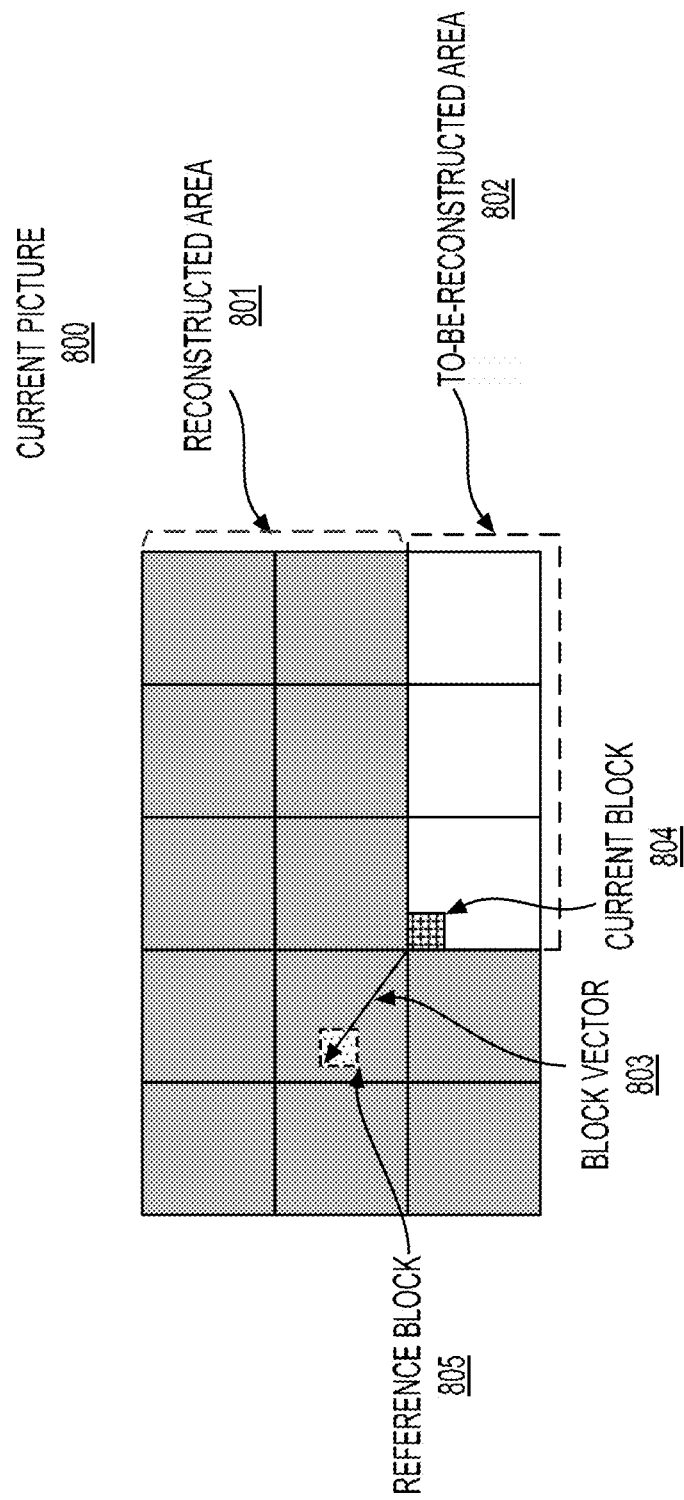
FIG. 8 shows an example of the intra block copy (IBC) prediction mode, according to an embodiment of the disclosure.

FIG. 8 shows an example of the intra block copy (IBC) prediction mode, according to an embodiment of the disclosure. In the example of FIG. 8, a current picture (800) is being reconstructed and includes a reconstructed area (801) (gray area) and a to-be-decoded area (802) (white area). The blocks in the reconstructed area (801) are already decoded and the blocks in the to-be-reconstructed area (802) are either being decoded or to-be-decoded. A current block (804) is in the to-be-reconstructed area (802) and being decoded. The current block (804) can be decoded from a reference block (805) that is in the reconstructed area (801). The decoding of the current block (804) is based on a block vector (803) that is an offset between the current block (804) and the reference block (805).

According to aspects of the disclosure, a reference picture (e.g., reference block (805)) used to derive a block vector (e.g., block vector (803)) for a current block (e.g., current block (804)) is within a search range of the IBC prediction mode.

According to some embodiments, a search range of the IBC prediction mode is constrained to be within a current CTU where a current block resides. In an example, a memory to store reference samples for the search range of the IBC prediction mode is 1 CTU size (e.g. 128×128 samples). If 1 CTU size (128×128 samples) includes four regions with each region having 64×64 samples, the memory may store such four regions, in which one region may be currently reconstructed 64×64 samples and the other three regions with each region having 64×64 samples may be reference samples.

According to some embodiments, a search range of the IBC prediction mode can be extended to some parts of a left CTU of the current CTU while keeping the memory to store the search range unchanged (e.g., 1 CTU size), so that the search range may not be constrained to be within the current CTU. It is noted that the search range may depend on a position of a current block in the current CTU. That is, the search range may be updated according to the position of the current block in the current CTU.

FIGS. 9A-9D show an example of an updating process for a search range of the IBC prediction mode, according to an embodiment of the disclosure. As described above, the effective search range is extended to some parts of a left CTU (910) of a current CTU (900).

During this updating process, the stored reference samples from the left CTU are updated with the reconstructed samples from the current CTU. In FIGS. 9A-9D, gray color regions indicate already reconstructed regions, white color regions indicate to-be-reconstructed regions, and regions with vertical stripes and text "Curr" indicate current coding/decoding regions where current blocks reside. In addition, in each figure, the left four regions (911)-(914) belong to the left CTU (910) and the right four regions (901)-(904) belong to the current CTU (900).

It is noted that all of four regions (911)-(914) of the left CTU (910) are already reconstructed. Thus, the memory initially stores all of these four regions of reference samples from the left CTU (910), and then updates a region of reference samples from the left CTU (910) with a same relative region of currently reconstructed samples from the current CTU (900).

Figure 9A:
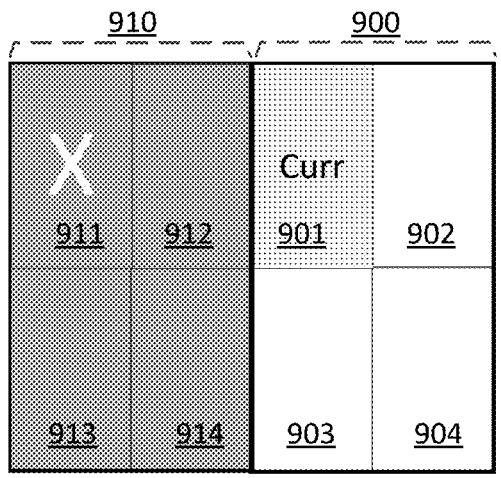
FIGS. 9A-9D show an example of an updating process for a search range of the IBC prediction mode, according to an embodiment of the disclosure.

For example, in FIG. 9A, a current region (901) in the current CTU (900) is under reconstruction, and a co-located region in the left CTU (910) of the current region (901) is an already reconstructed region (911). The co-located region (911) is in a region of the left CTU (910) with the same relative region as the current block (901) in the current CTU (900). Thus, the memory region that stores reference samples of the co-located region (911) is updated to store the reconstructed samples of the current region (901), and an "X" is marked in the co-located region (911) in FIG. 9A to indicate that the reference samples of the co-located region (911) are no longer stored in the memory.

Figure 9B:
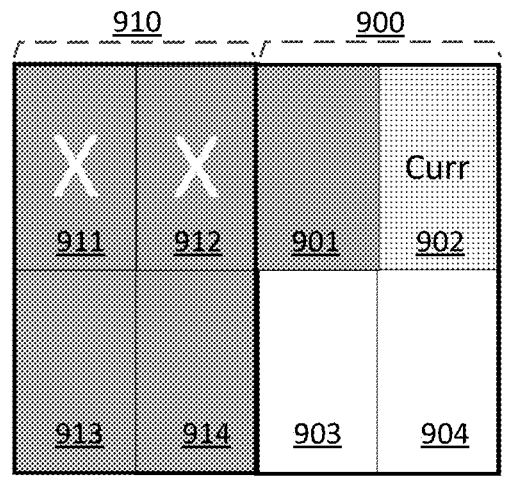

Similarly, in FIG. 9B, a current region (902) in the current CTU (900) is under reconstruction, and a co-located region in the left CTU (910) of the current region (902) is a region (912). The co-located region (912) is in a region of the left CTU (910) with the same relative region as the current region (902) in the current CTU (900). Thus, the memory region that stores reference samples of the co-located region (912) is updated to store the reconstructed samples of the current region (902), and an "X" is marked in the co-located region (912) in FIG. 9B to indicate that the reference samples of the co-located region (912) are no longer stored in the memory.

Figure 9C:
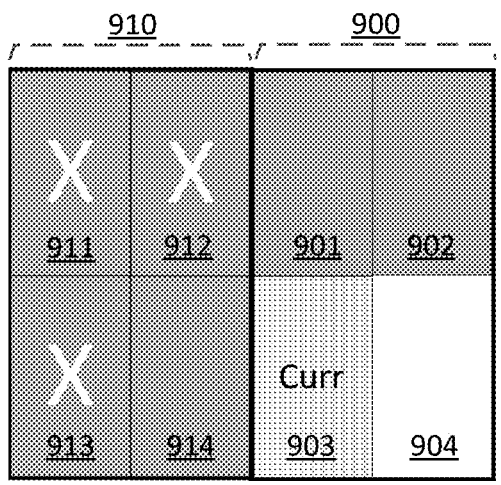

In FIG. 9C, a current region (903) in the current CTU (900) is under reconstruction, and a co-located region in the left CTU (910) of the current region (903) is a region (913). The co-located region (913) is in a region of the left CTU (910) with the same relative region as the current region (903) in the current CTU (900). Thus, the memory region that stores reference samples of the co-located region (913) is updated to store the reconstructed samples of the current region (903), and an "X" is marked in the co-located region (913) in FIG. 9C to indicate that the reference samples of the co-located region (913) are no longer stored in the memory.

Figure 9D:
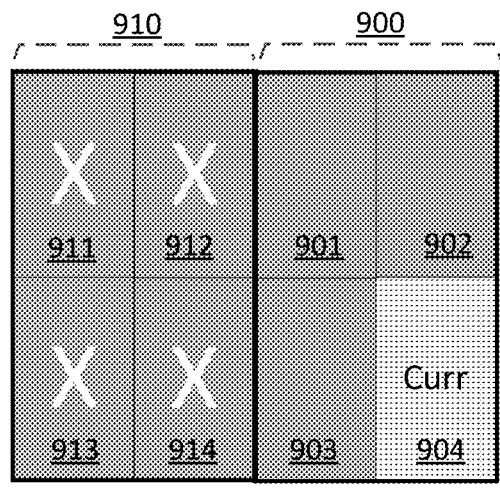

In FIG. 9D, a current region (904) in the current CTU (900) is under reconstruction, and a co-located region in the left CTU (910) of the current region (904) is a region (914). The co-located region (914) is in a region of the left CTU (910) with the same relative region as the current region (904) in the current CTU (900). Thus, the memory region that stores reference samples of the co-located region (914) is updated to store the reconstructed samples of the current region (904), and an "X" is marked in the co-located region (914) in FIG. 9D to indicate that the reference samples of the co-located region (914) are no longer stored in the memory.

According to aspects of the disclosure, a valid block vector that is derived within a search range of the IBC prediction mode may follow some constraints to meet bitstream conformance conditions.

Figure 10:
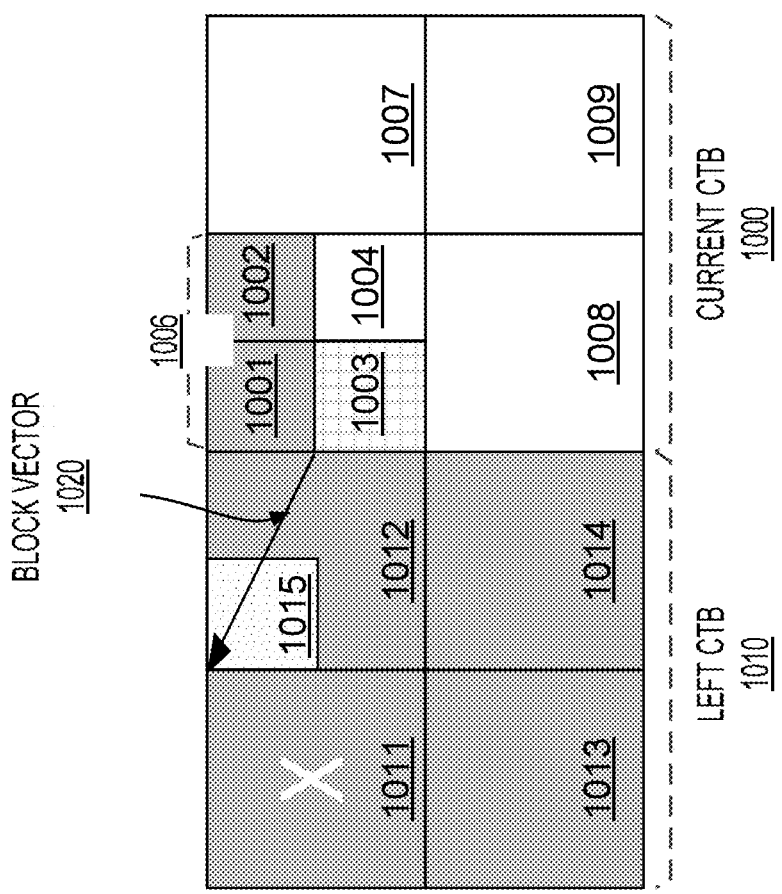
FIG. 10 shows an example of a valid block vector that follows certain constraints, according to an embodiment of the disclosure.

FIG. 10 shows an example of a valid block vector (1020) that follows certain constraints, according to an embodiment of the disclosure. In the FIG. 10 example, a current CTB (1000) is a luma CTB including four luma regions (1006)-(1009). When a derivation process for reference block availability is invoked, a position (xCurr, yCurr) of a top-left sample of a current block (1003) in the current CTB (1000) is set to be (xCb, yCb), and the valid luma block vector (1020) may follow certain constraints. The valid luma block vector (1020) points from the current block (1003) to a reference block (1015) in a left CTB (1010) of the current CTB (1000).

According to some embodiments, a first constraint is that a reference block for the current block is already reconstructed. In an example, for a rectangle reference block, a reference block is determined to be already reconstructed when both a top-left sample and a bottom-right sample of the reference block are already reconstructed. Specifically, for a luma block vector mvL with 1/16 pel resolution, when a position (xCb+(mvL[0]>>4), yCb+(mvL[1]>>4)) of the top-left sample of the reference block is input, a TRUE is output, indicating the top-left sample of the reference block is already reconstructed. It is noted that mvL[0] and mvL[1] are x component and y component of the two dimensional luma block vector mvL. Similarly, when a position (xCb+(mvL[0]>>4)+cbWidth−1, yCb+(mvL[1]>>4)+cbHeight−1) of the bottom-right sample of the reference block is input, a TRUE is output, indicating the bottom-right sample of the reference block is already reconstructed. It is noted that the parameters cbWidth and cbHeight represent a width and a height of the reference block. Accordingly, when both positions (xCb+(mvL[0]>>4), yCb+(mvL[1]>>4)) and (xCb+(mvL[0]>>4)+cbWidth−1, yCb+(mvL[1]>>4)+cbHeight−1) are input, a TRUE is output, indicating both of the top-left sample and the bottom-right sample of the reference block, as well as the reference block itself, are already reconstructed, and thus, the block vector is valid, as shown in FIG. 10. However, if the reference block is not already reconstructed, the luma block vector mvL may be invalid.

According to some embodiments, a second constraint is that the reference block does not overlap with the current block. Under the constraint that the reference block is already constructed, the reference block can be either to the left of the current block or to the top of the current block in order to avoid overlapping with the current block. In an example, for a luma block vector mvL with 1/16 pel resolution, at least one of the two values (mvL[0]>>4)+cbWidth and (mvL[1]>>4)+cbHeight is less than or equal to 0. Specifically, the value (mvL[0]>>4)+cbWidth is less than or equal to 0, indicating that the reference block is to the left of the current block and does not overlap with the current block. Similarly, the value (mvL[1]>>4)+cbHeight is less than or equal to 0, indicating the reference block is to the top of the current block and does not overlap with the current block. Accordingly, if both values (mvL[0]>>4)+cbWidth and (mvL[1]>>4)+cbHeight are more than 0, the reference block overlaps with the current block so that the luma block vector mvL of the current block may be invalid.

According to some embodiments, a third constraint is that a CTB where the reference block resides is either a left neighboring CTB of a current CTB or the current CTB itself. In an example, for a luma block vector mvL with 1/16 pel resolution, equations (1)-(4) are satisfied to meet this constraint:

$$(yCb+(mvL[1]>>4))>>Ctb \text{ Log 2SizeY}=yCb>>Ctb \text{ Log 2SizeY} \quad (1)$$

$$(yCb+(mvL[1]>>4)+cbHeight-1)>>Ctb \text{ Log 2SizeY}=yCb>>Ctb \text{ Log 2SizeY} \quad (2)$$

$$(xCb+(mvL[0]>>4))>>Ctb \text{ Log 2SizeY} \geq (xCb>>Ctb \text{ Log 2SizeY})-1 \quad (3)$$

$$(xCb+(mvL[0]>>4)+cbWidth-1)>>Ctb \text{ Log 2SizeY} \leq (xCb>>Ctb \text{ Log 2SizeY}) \quad (4)$$

It is noted that the parameter Ctb Log 2SizeY represents a CTB width in log 2 form. For example, if the CTB width is 128 samples, the parameter Ctb Log 2SizeY is 7. Specifically, equations (1) and (2) indicate that the CTB where the reference block resides is in a same CTB row as the current CTB, and equations (3) and (4) indicate that the CTB where the reference block resides is either in a left CTB column of the current CTB or a same CTB column as the current CTB. Accordingly, the equations (1)-(4) are satisfied, indicating that the reference block resides in either the left neighboring CTB, such as the left CTB (1010) in the FIG. 10 example, of the current CTB (1000) or the current CTB (1000) itself. However, if the reference block does not reside in either of the left neighboring CTB of the current CTB or the current CTB itself, the luma block vector mvL is invalid.

According to some embodiments, a fourth constrain is that when the reference block resides in the left neighboring CTB of the current CTB, a co-located region of the reference block in the current CTB has not been reconstructed. The co-located region of the reference block in the current CTB is a region in the current CTB with the same relative region as the reference block in the left neighboring CTB. Referring back to FIG. 10, the reference block (1015) resides in the region (1012) of the left neighboring CTB (1010), therefore, the co-located region of the reference block (1015) in the current CTB (1000), i.e., the region (1017), has not been reconstructed. In an example, for a luma block vector mvL with 1/16 pel resolution, when the equation (5) is satisfied, $$(xCb+(mvL[0]>>4))>>Ctb \text{ Log 2SizeY}=(xCb>>Ctb \text{ Log 2SizeY})-1 \quad (5)$$

and a position of the co-located region in the current CTB (((xCb+(mvL[0]>>4)+CtbSizeY)>>(Ctb Log 2SizeY-1))<<(Ctb Log 2SizeY-1), ((yCb+(mvL[1]>>4))>>(Ctb Log 2SizeY-1))<<(Ctb Log 2SizeY-1)) is input, a FALSE is output. It is noted that the parameter CtbSizeY represents the CTB width. Specifically, the equation (5) indicates that the reference block is in the left neighboring CTB of the current CTB.

Still referring back to FIG. 10, when one of the coding blocks (1002)-(1003) is a current block, a reference block cannot be in the region (1011), and thus, a search range for the one of the coding blocks (1002)-(1003) excludes the region (1011), which is marked "X" similar to FIG. 9A. The reasons are as follow: if the reference block is in the region (1011), then a co-located region for the reference block is the region (1006), however, at least some samples in the coding block (1001) have been reconstructed, thus the fourth constraint is violated. On the other hand, for a coding block to be reconstructed first in a current region, such as the coding block (1001) in the region (1006) of the current CTB (1000), the fourth constraint does not prevent a reference block to be in the region (1011) because the co-located region (1006) for the reference block has not been reconstructed yet, for example, such that the reference samples of the region (1011) are not overwritten or deleted.

According to aspects of the disclosure, the IBC prediction mode is considered as a separate mode or a third mode in addition to the intra prediction mode and inter prediction mode. That is, the IBC prediction mode is different from either the intra prediction mode or the inter prediction mode. By doing this, the block vector prediction in implicit mode (similar to the merge mode of the inter prediction mode) and explicit mode (similar to the AMVP mode of the inter prediction mode) are separated from regular inter prediction mode.

A separate predictor candidate list is defined for the implicit mode of the IBC prediction mode. The separate predictor candidate list of the implicit mode of the IBC prediction mode differs from a merge candidate list in the merge mode of the inter prediction mode in that all the entries in the predictor candidate list are block vectors. The candidate derivation process of the separate predictor candidate list may be based on the candidate derivation process of a merge candidate list. As an example, the 5 spatial neighboring locations in the merge mode of the inter prediction mode in HEVC or VVC standards can be accessed for the IBC prediction mode to derive its own predictor candidate list for the implicit mode. In addition, another separate predictor candidate list may be defined for the explicit mode of the IBC prediction mode, where all the entries in the list are also block vectors. The candidate derivation process of the separate predictor candidate for the explicit mode list may be based on that of a predictor candidate list in the AMVP mode of the inter prediction mode.

Accordingly, as a separate mode from the inter prediction mode, the IBC prediction mode can have a simplified and unified block vector derivation process for both implicit mode and explicit mode.

According to aspects of the disclosure, a block vector predictor candidate list of the IBC prediction mode includes a plurality of block vector predictor candidates and each of the plurality of block vector predictor candidates can be from one of the following block vectors: a block vector of spatial neighboring-based block vectors, a block vector of history-based block vectors, an averaged block vector, and a block vector of default block vectors.

Figure 11:
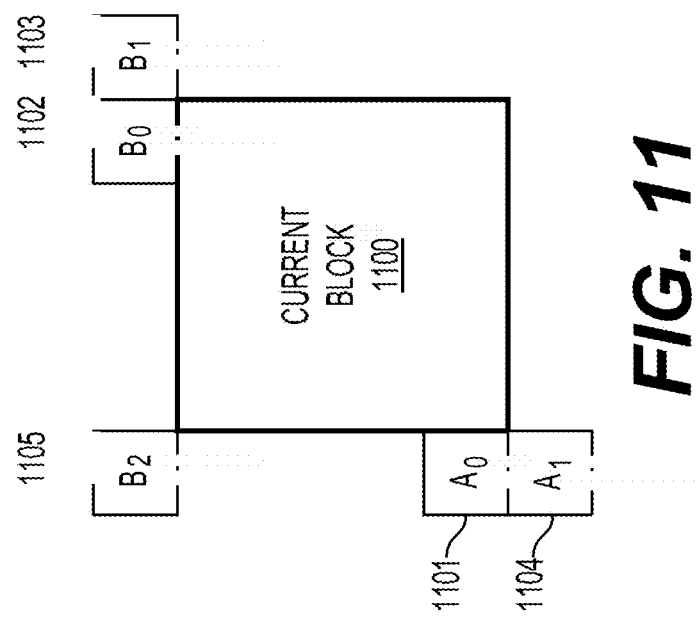
FIG. 11 shows an example of spatial neighboring-based block vectors, according to an embodiment of the disclosure.

FIG. 11 shows an example of spatial neighboring-based block vectors, according to an embodiment of the disclosure. A current block (1100) has 5 spatial neighboring blocks (1101)-(1105) in the bottom-left, top-right, and top-left positions.

In one embodiment, an order of forming a block vector predictor candidate list of the IBC prediction mode from the 5 spatial neighboring blocks is: A0 (1101)→B0 (1102)→B1 (1103)→A1 (1104)→B2 (1105).

In one embodiment, only A0 and B0 from the spatial neighboring-based block vectors may be contained in a block vector predictor candidate list. When both A0 and B0 are available but equal to each other, only one may be included in the block vector predictor candidate list.

In one embodiment, only A1 and B1 from the spatial neighboring-based block vectors may be contained in a block vector predictor candidate list. When both A1 and B1 are available but equal to each other, only one may be included in the block vector predictor candidate list.

In one embodiment, only Ax and By from the spatial neighboring-based block vectors may be contained in a block vector predictor candidate list, where Ax and By represents one of the left neighbors and one of the top neighbors, respectively.

According to some embodiments, history-based block vector predictor (HBVP) candidates are included in a block vector predictor candidate list. In an example, a HBVP candidate may be included in a block vector predictor candidate list after the spatial neighboring-based block vectors. The HBVP candidate is derived based on a previously coded block and is stored in a HBVP table. The HBVP table with multiple HBVP candidates is maintained during the encoding/decoding process. The HBVP table can be reset (emptied) when a new CTU row is encountered. Whenever there is a non-sub-block IBC CU, the associated block vector is added to a last entry of the HBVP table as a new HBVP candidate.

According to some embodiments, the HBVP table size S is set to be 6, indicating up to 6 HBVP candidates may be added to the table. When inserting a new HBVP candidate to the HBVP table, a constrained first-in-first-out (FIFO) rule is utilized where a redundancy check is first applied to the HBVP table in order to find whether there is an identical or similar HBVP candidate in the HBVP table. In an example, when an identical or similar HBVP candidate is found in the HBVP table, the identical or similar HMVP is removed from the HBVP table such that all the HBVP candidates afterwards can be moved forward.

It is noted that the HBVP table size can be varied in some embodiments. That is, the size S can be less or more than 6 in some embodiments. When the size is more than 6, in some embodiments, no pruning is used when including a new HBVP candidate into the HBVP table.

According to some embodiments, when constructing a block vector predictor candidate list, the latest several HBVP candidates in the HBVP table are checked in order and included in the candidate list after the spatial neighboring-based candidates. Redundancy check is applied on the HBVP candidates to the spatial neighboring-based candidates. To reduce the number of redundancy check operations, a number of HBPV candidates used for constructing a block vector predictor candidate list is set as (N<=4)? M:(8−N), where N indicates a number of existing candidates in the candidate list and M indicates a number of available HBVP candidates in the HBVP table. Once the total number of available block vector predictor candidates reaches a maximally allowed number minus 1, the block vector predictor candidate list construction process from HBVP is terminated.

According to some embodiments, an averaged block vector may be included into a block vector predictor candidate list. The averaged block vector can be derived by selecting a plurality of predictor candidates from the candidate list and then averaging the selected predictor candidates.

In one example, a first candidate and a second candidate are averaged to form a new candidate in the list.

In another example, the first three candidates are averaged in pairs to form a set of three new candidates. An order of the three new candidates derived from the first three existing candidates may be (1st, 2nd), (1st, 3rd) and (2nd, 3rd), where 1st, 2nd, and 3rd correspond to the first three existing candidates in the list, respectively.

In another example, the first four candidates are averaged in pairs to form a set of six new candidates. An order of the six new candidates derived from the first four existing candidates may be (1st, 2nd), (1st, 3rd), (2nd, 3rd), (1st, 4th), (2nd, 4th), (3rd, 4th), where 1st, 2nd, 3rd, and 4th correspond to the first four existing candidates in the list, respectively.

According to some embodiments, default block vectors can be included in a block vector predictor candidate list. The default block vectors can be predefined.

In one embodiment, constant based block vectors may be used. Some example default block vectors include, but are not limited to (0, 0), (−8, 0), (0, −8), (−4, 0), (0, −4), (−8, −8), and (−4, −4). These block vectors, in whole or in part, may be arranged in the above order to be included in a block vector predictor candidate list, or may be in other orders.

In one embodiment, block size related block vectors may be used. Some example default block vectors include, but are not limited to (−2w, 0), (0, −2h), (−w, 0), (0, −h), (−2w, −2h), and (−w, −h), where w and h represent a width and a height of a current block, respectively. These block vectors, in whole or in part, may be arranged in the above order to be included in a block vector predictor candidate list, or may be in other orders.

In one embodiment, maximum block size related block vectors may be used. Some example default block vectors include, but are not limited to (−2w_max, 0), (0, −2h_max), (−w_max, 0), (0, −h_max), (−2w_max, −2h_max), and (−w_max, −h_max), where w_max and h_max represent a maximum allowed width and a maximum allowed height of a current block, respectively. These block vectors, in whole or in part, may be arranged in the above order to be included in a block vector predictor candidate list, or may be in other orders.

In one embodiment, minimum block size related block vectors may be used. Some example default block vectors include, but are not limited to (−2w_min, 0), (0, −2h_min), (−w_min, 0), (0, −h_min), (−2w_min, −2h_min), and (−w_min, −h_min), where w_min and h_min represent a minimum allowed width and a minimum allowed height of a current block, respectively. These block vectors, in whole or in part, may be arranged in the above order to be included in a block vector predictor candidate list, or may be in other orders.

In one embodiment, an order of candidates in a block vector predictor candidate list is spatial neighboring-based block vectors→history-based block vectors→averaged block vectors→default block vectors.

In one embodiment, an order of candidates in a block vector predictor candidate list is spatial neighboring-based block vectors→history-based block vectors→default block vectors.

According to aspects of the disclosure, a unified block vector predictor candidate list can be used in both the implicit mode and the explicit mode of the IBC prediction mode. However, the candidate list may be applied to only one of the implicit mode and the explicit mode of the IBC prediction mode. In one embodiment, when a candidate derived from this unified list is selected to be applied to the explicit mode, a rounding of a selected block vector predictor candidate towards a selected block vector resolution may be disabled. That is, the selected block vector predictor candidate is at its original resolution, even when a resolution of a block vector difference is at a different resolution.

According to aspects of the disclosure, a block vector predictor candidate list may be subject to a pruning or a clipping process. That is, if a block vector predictor in the list is considered as an invalid predictor for a current block, for example, a reference block of the current block in the IBC prediction mode will be out of an allowed search range if the invalid predictor is directly used as a final block vector, then an additional operation is performed.

In one embodiment, in a pruning process, all of invalid candidates in a candidate list are removed from the list such that subsequent valid candidates can be moved up in the list.

In one embodiment, in a pruning process, one or more invalid candidates in a candidate list are removed from the list. Examples of invalid candidates include, but are not limited to candidates that do not follow a constraint that a reference block does not overlap with a current block and candidates that do not follow a constraint that a CTB where a reference block of a current block resides is either a left neighboring CTB of a current CTB or the current CTB itself.

In one embodiment, in a clipping process, invalid candidates are clipped such that each of the clipped candidates points to positions inside a valid search range of the IBC prediction mode. Such a clipping process can be done by modifying a horizontal, a vertical, or both components of a block vector predictor in a way that after the modification, the block vector predictor points to a border of the valid search range of the IBC prediction mode.

Figure 12:
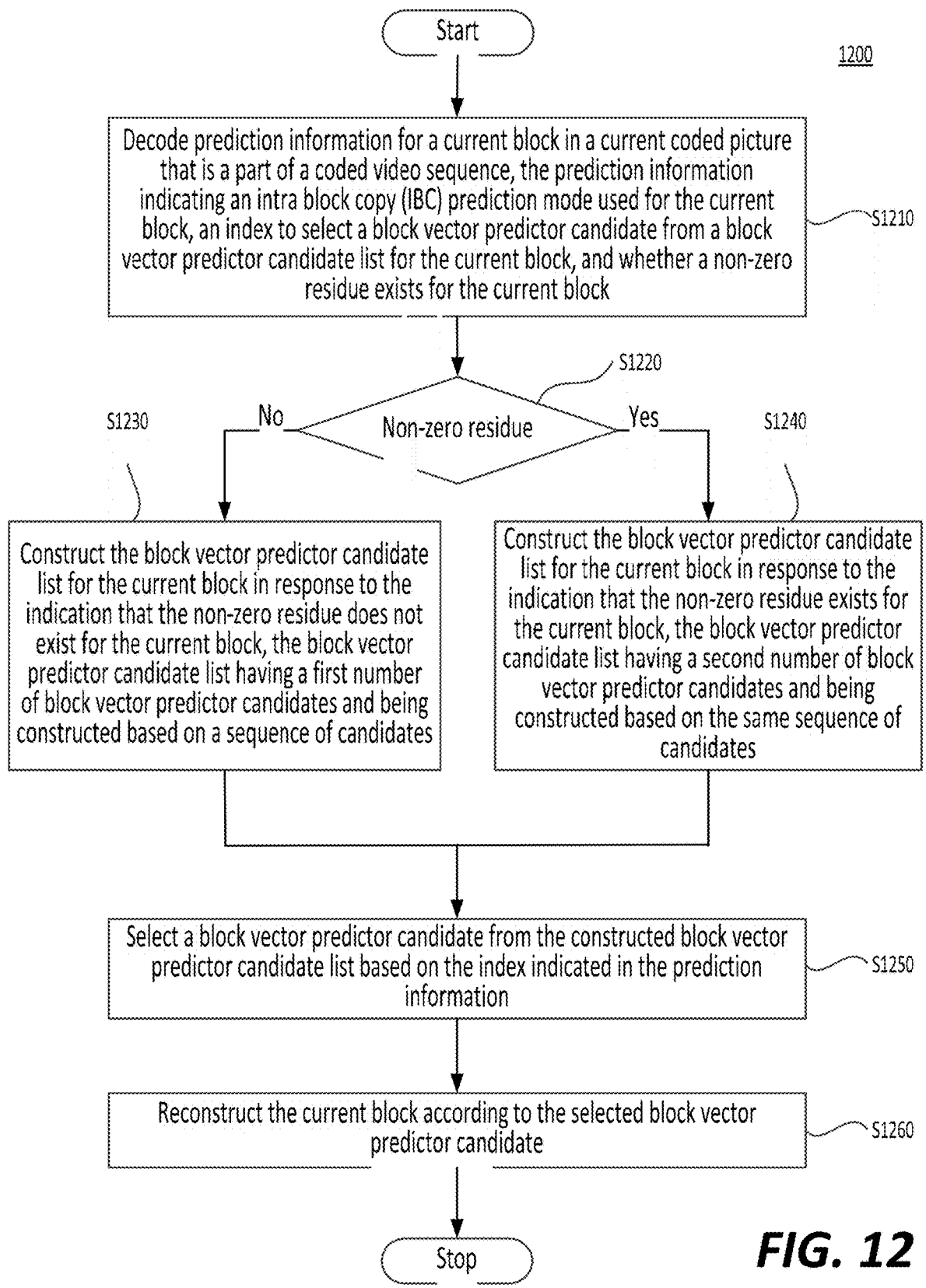
FIG. 12 shows a flow chart outlining an exemplary process according to an embodiment of the disclosure.

FIG. 12 shows a flow chart outlining an exemplary process (1200) according to an embodiment of the disclosure. The process (1200) can be used in the reconstruction of a block coded in an IBC prediction mode, so as to generate a prediction block for a block under reconstruction. In various embodiments, the process (1200) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1200) is implemented in software instructions, thus when the processing circuitry executes the software instructions, the processing circuitry performs the process (1200).

The process (1200) may generally start at step (S1210), where the process (1200) decodes prediction information for a current block in a current coded picture that is a part of a coded video sequence. The prediction information indicates an intra block copy (IBC) prediction mode is used for the current block. The prediction information can also indicate an index to select a block vector predictor candidate from a block vector predictor candidate list for the current block, and whether a non-zero residue exists for the current block.

After decoding the prediction information, the process (1200) proceeds to step (S1220).

At step (S1220), the process (1200) determines whether a non-zero residue exists for the current block based on the prediction information. If the process (1200) determines that the non-zero residue does not exist for the current block, then the process (1200) proceeds to step (S1230). Otherwise, the process (1200) proceeds to step (S1240).

At step (S1230), the process (1200) constructs the block vector predictor candidate list for the current block in response to the indication that the non-zero residue does not exist for the current block. The block vector predictor candidate list has a first number of block vector predictor candidates and is constructed based on a sequence of candidates.

At step (S1240), the process (1200) constructs the block vector predictor candidate list for the current block in response to the indication that the non-zero residue exists for the current block. The block vector predictor candidate list has a second number of block vector predictor candidates and is constructed based on the same sequence of candidates that is processed in step (S1230).

In an embodiment, the process (1200) determines whether a first block vector of a first spatial neighboring block of a plurality of spatial neighboring blocks of the current block is available. In response to the determination that the first block vector of the first spatial neighboring block of the plurality of spatial neighboring blocks of the current block is available, the process (1200) adds the first block vector into the block vector predictor candidate list. Otherwise, the process (1200) determines whether a second block vector of a second spatial neighboring block of the plurality of spatial neighboring blocks of the current block is available and in some embodiments, whether the second block vector of the second spatial neighboring block is the same as or similar to the first block vector of the first spatial neighboring block. In response to the determination that the second block vector of the second spatial neighboring block of the plurality of spatial neighboring blocks of the current block is available and in some embodiments, that the second block vector of the second spatial neighboring block is not the same as the first block vector of the first spatial neighboring block, the processing circuitry adds the second block vector into the block vector predictor candidate list.

In an embodiment, the first spatial neighboring block of the current block is adjacent to a lower-left corner of the current block and a bottom side of the first spatial neighboring block is aligned to a bottom side of the current block, and the second spatial neighboring block of the current block is adjacent to an upper-right corner of the current block and a right side of the second spatial neighboring block is aligned to a right side of the current block.

In one embodiment, the first spatial neighboring block of the current block is adjacent to the lower-left corner of the current block and a top side of the first spatial neighboring block is aligned to the bottom side of the current block, and the second spatial neighboring block of the current block is adjacent to the upper-right corner of the current block and a left side of the second spatial neighboring block is aligned to the right side of the current block.

In one embodiment, the first spatial neighboring block of the current block is adjacent to a left side of the current block and the second spatial neighboring block of the current block is adjacent to a top side of the current block.

In one embodiment, when a total number of the block vectors of the plurality of spatial neighboring blocks included in the block vector predictor candidate list is less than a maximum allowed number that is based on, for example, whether the non-zero residue exists for the current block, the process (1200) selects a third block vector of a previously coded block from a plurality of block vectors of previously coded blocks. The process (1200) may determine whether the selected third block vector is different from the plurality of spatial neighboring blocks included in the block vector predictor candidate list. In response to the determination that the selected third block vector is different from the plurality of spatial neighboring blocks included in the block vector predictor candidate list, the process (1200) adds the selected third block vector into the block vector predictor candidate list.

In one embodiment, when a total number of the block vectors of the plurality of spatial neighboring blocks and the previously coded blocks included in the block vector predictor candidate list is less than the maximum allowed number and is above one, the process (1200) selects a plurality of block vector predictor candidates from the block vector predictor candidate list. The process (1200) averages the selected plurality of block vector predictor candidates to form at least one averaged block vector. The process (1200) adds the at least one averaged block vector into the block vector predictor candidate list.

In one embodiment, when a total number of the block vectors of the plurality of spatial neighboring blocks, the block vectors of the previously coded blocks, and the at least one average block vector included in the block vector predictor candidate list is less than the maximum allowed number, the process (1200) adds one or more default block vectors into the block vector predictor candidate list.

After constructing the block vector predictor candidate list for the current block, the process (1200) proceeds to step (S1250).

At step (S1250), the process (1200) selects a block vector predictor candidate from the constructed block vector predictor candidate list, for example, based on an index indicated in the prediction information. The index may be signaled explicitly or implicitly.

After selecting the block vector predictor candidate, the process (1200) proceeds to step (S1260).

At step (S1260), the process (1200) reconstructs the current block according to the selected block vector predictor candidate.

After reconstructing the current block, the process (1200) terminates.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
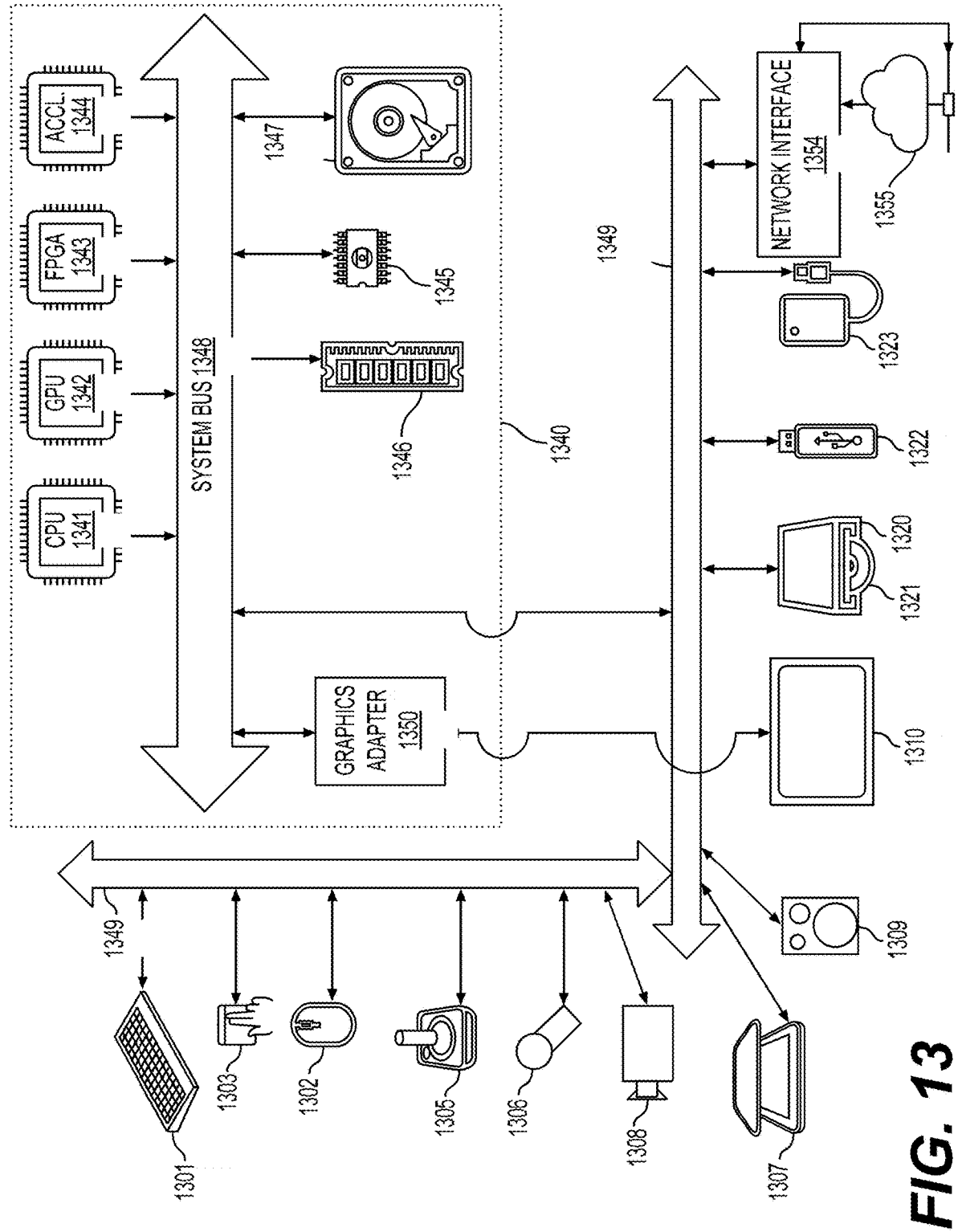
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Appendix A: Acronyms
AMVP: Advanced Motion Vector Prediction
ASIC: Application-Specific Integrated Circuit
BMS: Benchmark Set
BV: Block Vector
CANBus: Controller Area Network Bus
CD: Compact Disc
CPR: Current Picture Referencing
CPUs: Central Processing Units
CRT: Cathode Ray Tube
CTBs: Coding Tree Blocks
CTUs: Coding Tree Units
CU: Coding Unit
DPB: Decoder Picture Buffer
DVD: Digital Video Disc
FPGA: Field Programmable Gate Areas
GOPs: Groups of Pictures
GPUs: Graphics Processing Units
GSM: Global System for Mobile communications
HEVC: High Efficiency Video Coding
HRD: Hypothetical Reference Decoder
IBC: Intra Block Copy
IC: Integrated Circuit
JEM: Joint Exploration Model
LAN: Local Area Network
LCD: Liquid-Crystal Display
LTE: Long-Term Evolution
MV: Motion Vector
OLED: Organic Light-Emitting Diode
PBs: Prediction Blocks
PCI: Peripheral Component Interconnect
PLD: Programmable Logic Device
PUs: Prediction Units
RAM: Random Access Memory
ROM: Read-Only Memory
SCC: Screen Content Coding
SEI: Supplementary Enhancement Information
SNR: Signal Noise Ratio
SSD: Solid-state Drive
TUs: Transform Units
USB: Universal Serial Bus
VUI: Video Usability Information
VVC: Versatile Video Coding

What is claimed is:

1. A method for video encoding, comprising:
determining whether coding of a current block in an intra block copy (IBC) prediction mode is performed in an explicit mode or an implicit mode based on whether a difference exists between a block vector and a corresponding block vector predictor, the current block being part of a current picture to be coded, the coding of the current block being determined to be in the implicit mode when the difference does not exist and being determined to be in the explicit mode when the difference does exist;
constructing a block vector predictor candidate list for the current block based on a sequence of candidates, the block vector predictor candidate list having a first number of block vector predictor candidates in the implicit mode, and having a second number of block vector predictor candidates in the explicit mode;
selecting a block vector predictor candidate from the constructed block vector predictor candidate list and encoding the current block according to the selected block vector predictor candidate; and
encoding, in prediction information of the current block, an index indicating the selected block vector predictor candidate.

2. The method of claim 1, further comprising:
determining whether a first block vector of a first spatial neighboring block of a plurality of spatial neighboring blocks of the current block is available;
inserting the first block vector into the block vector predictor candidate list in response to a determination that the first block vector of the first spatial neighboring block of the plurality of spatial neighboring blocks of the current block is available;
determining whether a second block vector of a second spatial neighboring block of the plurality of spatial neighboring blocks of the current block is available and whether the second block vector of the second spatial neighboring block is the same as the first block vector of the first spatial neighboring block; and
inserting the second block vector into the block vector predictor candidate list in response to a determination that the second block vector of the second spatial neighboring block of the plurality of spatial neighboring blocks of the current block is available and that the second block vector of the second spatial neighboring block is not the same as the first block vector of the first spatial neighboring block.

3. The method of claim 2, wherein the first spatial neighboring block of the current block is adjacent to a lower-left corner of the current block and a bottom side of the first spatial neighboring block is aligned to a bottom side of the current block, and the second spatial neighboring block of the current block is adjacent to an upper-right corner of the current block and a right side of the second spatial neighboring block is aligned to a right side of the current block.

4. The method of claim 2, wherein the first spatial neighboring block of the current block is adjacent to a lower-left corner of the current block and a top side of the first spatial neighboring block is aligned to a bottom side of the current block, and the second spatial neighboring block of the current block is adjacent to an upper-right corner of the current block and a left side of the second spatial neighboring block is aligned to a right side of the current block.

5. The method of claim 2, wherein the first spatial neighboring block of the current block is adjacent to a left side of the current block and the second spatial neighboring block of the current block is adjacent to a top side of the current block.

6. The method of claim 2, further comprising:
when a total number of block vectors of the plurality of spatial neighboring blocks included in the block vector predictor candidate list is less than a maximum allowed number that is based on whether the difference does exist between the block vector and the corresponding block vector predictor for the current block,
selecting a third block vector of a previously coded block from a plurality of block vectors of previously coded blocks;
determining whether the selected third block vector is different from the block vectors of the plurality of spatial neighboring blocks included in the block vector predictor candidate list; and
inserting the selected third block vector into the block vector predictor candidate list in response to a determination that the selected third block vector is different from the block vectors of the plurality of spatial neighboring blocks included in the block vector predictor candidate list.

7. The method of claim 6, further comprising:
when a total number of the block vectors of the plurality of spatial neighboring blocks and the previously coded blocks included in the block vector predictor candidate list is less than the maximum allowed number and is above one,
selecting a plurality of block vector predictor candidates from the block vector predictor candidate list;
averaging the selected plurality of block vector predictor candidates to form at least one averaged block vector; and
inserting the at least one averaged block vector into the block vector predictor candidate list.

8. The method of claim 7, further comprising:
when a total number of the block vectors of the plurality of spatial neighboring blocks, the block vectors of the previously coded blocks, and the at least one averaged block vector included in the block vector predictor candidate list is less than the maximum allowed number, inserting a default block vector into the block vector predictor candidate list.

9. The method of claim 8, wherein the default block vector is (0, 0).

10. The method of claim 1, wherein the selected block vector predictor candidate is not rounded when the difference does exist between the block vector and the corresponding block vector predictor for the current block.

11. The method of claim 1, further comprising:
when a block vector predictor candidate included in the block vector predictor candidate list is invalid, performing a pruning process or clipping process on the invalid block vector predictor candidate.

12. The method of claim 11, wherein the block vector predictor candidate is determined to be invalid when a reference block predicted by the block vector predictor candidate is out of an allowed search range for the IBC prediction mode.

13. An apparatus, comprising:
a processing circuitry configured to:
determine whether coding of a current block in an intra block copy (IBC) prediction mode is performed in an explicit mode or an implicit mode based on whether a difference exists between a block vector and a corresponding block vector predictor, the current block being part of a current picture to be coded, the coding of the current block being determined to be in the implicit mode when the difference does not exist and being determined to be in the explicit mode when the difference does exist;

construct a block vector predictor candidate list for the current block based on a sequence of candidates, the block vector predictor candidate list having a first number of block vector predictor candidates in the implicit mode, and having a second number of block vector predictor candidates in the explicit mode;

select a block vector predictor candidate from the constructed block vector predictor candidate list and encode the current block according to the selected block vector predictor candidate; and encode, in prediction information of the current block, an index indicating the selected block vector predictor candidate.

14. The apparatus of claim 13, wherein the processing circuitry is further configured to:

determine whether a first block vector of a first spatial neighboring block of a plurality of spatial neighboring blocks of the current block is available;

insert the first block vector into the block vector predictor candidate list in response to a determination that the first block vector of the first spatial neighboring block of the plurality of spatial neighboring blocks of the current block is available;

determine whether a second block vector of a second spatial neighboring block of the plurality of spatial neighboring blocks of the current block is available and whether the second block vector of the second spatial neighboring block is the same as the first block vector of the first spatial neighboring block; and insert the second block vector into the block vector predictor candidate list in response to a determination that the second block vector of the second spatial neighboring block of the plurality of spatial neighboring blocks of the current block is available and that the second block vector of the second spatial neighboring block is not the same as the first block vector of the first spatial neighboring block.

15. The apparatus of claim 14, wherein the first spatial neighboring block of the current block is adjacent to a lower-left corner of the current block and a bottom side of the first spatial neighboring block is aligned to a bottom side of the current block, and the second spatial neighboring block of the current block is adjacent to an upper-right corner of the current block and a right side of the second spatial neighboring block is aligned to a right side of the current block.

16. The apparatus of claim 14, wherein the first spatial neighboring block of the current block is adjacent to a lower-left corner of the current block and a top side of the first spatial neighboring block is aligned to a bottom side of the current block, and the second spatial neighboring block of the current block is adjacent to an upper-right corner of the current block and a left side of the second spatial neighboring block is aligned to a right side of the current block.

17. The apparatus of claim 14, wherein the first spatial neighboring block of the current block is adjacent to a left side of the current block and the second spatial neighboring block of the current block is adjacent to a top side of the current block.

18. The apparatus of claim 14, wherein the processing circuitry is further configured to:

when a total number of block vectors of the plurality of spatial neighboring blocks included in the block vector predictor candidate list is less than a maximum allowed number that is based on whether the difference does exist between the block vector and the corresponding block vector predictor for the current block, select a third block vector of a previously coded block from a plurality of block vectors of previously coded blocks;

determine whether the selected third block vector is different from the block vectors of the plurality of spatial neighboring blocks included in the block vector predictor candidate list; and insert the selected third block vector into the block vector predictor candidate list in response to a determination that the selected third block vector is different from the block vectors of the plurality of spatial neighboring blocks included in the block vector predictor candidate list.

19. The apparatus of claim 18, wherein the processing circuitry is further configured to:

when a total number of the block vectors of the plurality of spatial neighboring blocks and the previously coded blocks included in the block vector predictor candidate list is less than the maximum allowed number and is above one, select a plurality of block vector predictor candidates from the block vector predictor candidate list;

average the selected plurality of block vector predictor candidates to form at least one averaged block vector; and insert the at least one averaged block vector into the block vector predictor candidate list.

20. A non-transitory computer-readable storage medium storing computer-readable instructions thereon that, when executed by processing circuitry of an encoder, cause the processing circuitry to perform a method comprising:

determining whether coding of a current block in an intra block copy (IBC) prediction mode is performed in an explicit mode or an implicit mode based on whether a difference exists between a block vector and a corresponding block vector predictor, the current block being part of a current picture to be coded, the coding of the current block being determined to be in the implicit mode when the difference does not exist and being determined to be in the explicit mode when the difference does exist;

constructing a block vector predictor candidate list for the current block based on a sequence of candidates, the block vector predictor candidate list having a first number of block vector predictor candidates in the implicit mode, and having a second number of block vector predictor candidates in the explicit mode;

selecting a block vector predictor candidate from the constructed block vector predictor candidate list and encoding the current block according to the selected block vector predictor candidate; and encoding, in prediction information of the current block, an index indicating the selected block vector predictor candidate.

* * * * *